United States Patent
Taniuchi et al.

(10) Patent No.: US 12,059,974 B2
(45) Date of Patent: Aug. 13, 2024

(54) FAST CHARGER AND FAST CHARGING METHOD

(71) Applicant: HONDA MOTOR CO., LTD., Tokyo (JP)

(72) Inventors: Takuya Taniuchi, Saitama (JP); Masahiro Ohta, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 776 days.

(21) Appl. No.: 17/184,613

(22) Filed: Feb. 25, 2021

(65) Prior Publication Data
US 2021/0276453 A1 Sep. 9, 2021

(30) Foreign Application Priority Data
Mar. 3, 2020 (JP) .................. 2020-036194

(51) Int. Cl.
*H02J 7/00* (2006.01)
*B60L 53/10* (2019.01)
(Continued)

(52) U.S. Cl.
CPC ............ *B60L 58/26* (2019.02); *B60L 53/11* (2019.02); *B60L 53/14* (2019.02); *B60L 53/30* (2019.02);
(Continued)

(58) Field of Classification Search
None
See application file for complete search history.

(56) References Cited

U.S. PATENT DOCUMENTS

| 2009/0035648 A1 | 2/2009 | Kimura | |
| 2014/0093760 A1* | 4/2014 | Hermann | B60L 50/66 |
| | | | 429/66 |
| 2017/0179547 A1* | 6/2017 | Zhang | H01M 50/581 |

FOREIGN PATENT DOCUMENTS

| CN | 104953642 A | 9/2015 |
| CN | 106549464 A | 3/2017 |

(Continued)

OTHER PUBLICATIONS

Notification of Reasons for Refusal issued in the JP Patent Application No. 2020-036194, mailed on Sep. 5, 2023.
(Continued)

*Primary Examiner* — Arun C Williams
(74) *Attorney, Agent, or Firm* — CKC & Partners Co., LLC

(57) ABSTRACT

To provide a fast charger and a fast charging method that are highly efficient in fast charging of a solid-state battery.
A fast charger includes a charging section, a temperature acquisition section, and a controller. The charging section feeds current to a solid-state battery being a secondary battery. The temperature acquisition section acquires a temperature of the solid-state battery. The controller performs control to cool the solid-state battery if the temperature acquired by the temperature acquisition section is greater than or equal to a predetermined temperature.
The controller determines a plurality of inflection points on a curve representing changes in the temperature of the solid-state battery against internal resistance of the solid-state battery. The predetermined temperature corresponds to an inflection point on a high-temperature side among the plurality of inflection points.

6 Claims, 4 Drawing Sheets

(51) Int. Cl.
    *B60L 53/14*     (2019.01)
    *B60L 53/30*     (2019.01)
    *B60L 58/12*     (2019.01)
    *B60L 58/25*     (2019.01)
    *B60L 58/26*     (2019.01)

(52) U.S. Cl.
    CPC .............. *B60L 58/12* (2019.02); *B60L 58/25* (2019.02); *B60L 2240/545* (2013.01)

(56) References Cited

FOREIGN PATENT DOCUMENTS

| | | | |
|---|---|---|---|
| JP | 2002010508 A | 1/2002 |
| JP | 2007273348 A | 10/2007 |
| JP | 2008005662 A | 1/2008 |
| JP | 2010104108 A | 5/2010 |
| JP | 2010277839 A | 12/2010 |
| JP | 2016219224 A | 12/2016 |
| JP | 2017526129 A | 9/2017 |

OTHER PUBLICATIONS

Office Action issued in the CN Patent Application No. 202110211512.2, mailed on Nov. 21, 2023.

\* cited by examiner

FAST CHARGER AND FAST CHARGING METHOD

This application is based on and claims the benefit of priority from Japanese Patent Application No. 2020-036194, filed on 3 Mar. 2020, the content of which is incorporated herein by reference.

BACKGROUND OF THE INVENTION

Field of the Invention

The present disclosure relates to a fast charger and a fast charging method.

Related Art

In recent years, techniques related to chargers for charging secondary batteries have been proposed.

For example, a high-power and high-capacity secondary battery for use in an application such as motor drive in electric vehicles and hybrid electric vehicles needs to be charged fast.

A technique has therefore been proposed that is related to a fast charger and a fast charging method enabled for fast charging of a secondary battery.

Patent Document 1: Japanese Unexamined Patent Application, Publication No. 2010-104106

SUMMARY OF THE INVENTION

Japanese Unexamined Patent Application, Publication No. 2010-104108 discloses a method for controlling a hybrid vehicle. The method includes cooling a battery using a battery cooler upon a determination that the battery is likely to be charged.

It is also disclosed that in the cooling of the battery, the cooling power of the battery cooler is increased upon a determination that the battery is likely to be subjected to fast charging.

As the battery, a lithium-ion battery has been mainly used.

The lithium-ion battery contains an electrolytic solution, which is normally a flammable organic solvent. It is therefore necessary to ensure safety against heat.

Charging the battery at a high temperature promotes a deterioration reaction.

It is therefore necessary to cool the battery during fast charging thereof as disclosed in Japanese Unexamined Patent Application, Publication No. 2010-104108.

Meanwhile, a technique has been recently proposed that is related to a solid-state battery having high energy densities and containing a solid electrolyte, which is highly heat-safe.

However, even at present, fast chargers and fast charging methods for fast charging of solid-state batteries have not been sufficiently contemplated.

The present disclosure was achieved in consideration of the above-described circumstances, and an objective thereof is to provide a fast charger and a fast charging method that are highly efficient in fast charging of a solid-state battery.

An aspect of the present disclosure relates to a fast charger including a charging section, a temperature acquisition section, and a controller. The charging section feeds current to a solid-state battery being a secondary battery. The temperature acquisition section acquires a temperature of the solid-state battery. The controller performs control to cool the solid-state battery if the temperature acquired by the temperature acquisition section is greater than or equal to a predetermined temperature.

Preferably, the controller determines a plurality of inflection points on a curve representing changes in the temperature of the solid-state battery against internal resistance of the solid-state battery, and the predetermined temperature corresponds to an inflection point on a high-temperature side among the plurality of inflection points.

The predetermined temperature may be 60° C.

The predetermined temperature may be 80° C.

The temperature of the solid-state battery to be acquired by the temperature acquisition section may be a tab temperature.

Preferably, the fast charger further includes an identification section configured to identify a type of the secondary battery, and the controller performs the control to cool the solid-state battery if the identification section identifies the secondary battery as a solid-state battery and the temperature acquired by the temperature acquisition section is greater than or equal to the predetermined temperature.

Another aspect of the present disclosure relates to a fast charging method including acquiring, determining, and feeding. In the acquiring, a temperature of a solid-state battery being a secondary battery is acquired. In the determining, it is determined whether or not the temperature acquired is greater than or equal to a predetermined temperature. In the feeding, current is fed to at least one of the solid-state battery and a cooling system. The temperature of the solid-state battery is maintained at a temperature lower than the predetermined temperature.

According to the present disclosure, it is possible to provide a fast charger and a fast charging method that are highly efficient in fast charging of a solid-state battery.

DETAILED DESCRIPTION OF THE INVENTION

Figure 1:
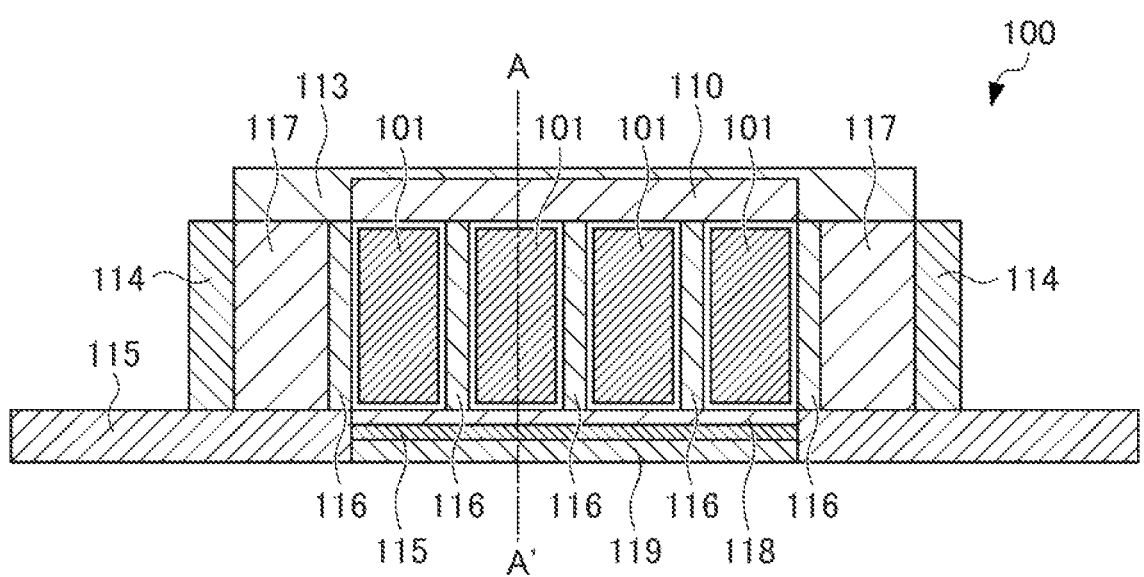
FIG. 1 is a diagram illustrating a secondary battery module to be charged by a fast charger according to an embodiment of the present disclosure.

The following describes an embodiment of the present disclosure. However, the embodiment described below is intended to illustrate and not limit the present disclosure.

<Fast Charger>

A fast charger according to the present embodiment is enabled for fast charging of a solid-state battery being a secondary battery.

The solid-state battery is, for example, in the form of a solid-state battery module for use in an on-vehicle application requiring high current and high voltage. The solid-state battery module has a modularized configuration including a plurality of solid-state batteries in combination.

The fast charger according to the present embodiment includes an identification section, a temperature acquisition section, a charging section, and a controller.

The fast charger is enabled for communication with a solid-state battery being charged and a cooling system for cooling the solid-state battery by a communication method such as Controller Area Network (CAN) communication.

The identification section identifies the type of the secondary battery to be charged.

The identification section identifies the type of the secondary battery by, for example, acquiring battery identification information by a communication method such as CAN communication with the secondary battery.

The following description is given on the assumption that the secondary battery identified by the identification section is a solid-state battery.

The temperature acquisition section acquires the temperature of the solid-state battery.

The temperature acquisition section can, for example, acquire a tab temperature measured by a temperature sensor in the solid-state battery module.

The tab temperature is, for example, the temperature of a positive electrode tab 104 and a negative electrode tab 109 of a solid-state battery module 100 described below.

The temperature acquisition section can acquire the temperature, such as the tab temperature, of the solid-state battery by a communication method such as CAN communication with the solid-state battery.

The temperature acquisition section may acquire a measured value of at least one of charging current, charging voltage, charging time, ambient temperature, and state of health (SOH) of the solid-state battery, and estimate the battery temperature of the solid-state battery based on the measured value.

The SOH is a figure of merit of deterioration of the solid-state battery, which is calculated by dividing the latest full discharge capacity of the solid-state battery by the initial full discharge capacity of the solid-state battery and multiplying the resulting quotient by 100.

The charging section feeds current to the solid-state battery. The charging section has, for example, a rectification circuit that is connected to an external alternating-current source by a power line and that rectifies alternating-current power fed from the external alternating-current source to direct-current power.

The charging section can also adjust the magnitude of the current to be fed to the solid-state battery.

The charging section and the solid-state battery are connected by a power line through a connector, for example.

The cooling system is, for example, capable of cooling the solid-state battery and is provided externally to the fast charger.

The cooling system has, for example, a circulator such as a pump capable of circulating cooling water 119 provided for the solid-state battery module 100 described below. This configuration enables exchange of heat generated from the solid-state battery module 100 with the outside.

The cooling system is, for example, connected to the charging section by a power line and uses electric power fed from the charging section to cause the circulator and the like to operate.

(Controller)

The controller is enabled for communication with the identification section, the temperature acquisition section, the charging section, and the external cooling system for the solid-state battery.

The controller performs control to cool the solid-state battery when the temperature of the solid-state battery acquired by the temperature acquisition section is greater than or equal to a predetermined temperature T2.

For example, the controller performs control to cause the cooling system to operate.

In addition, the controller may perform control to reduce charging current $I_1$ being fed to the solid-state battery during the fast charging of the solid-state battery.

Through the above-described control, the temperature of the solid-state battery having reached the predetermined temperature T2 is returned into and maintained within a temperature range lower than the predetermined temperature T2.

The controller may perform control to heat the solid-state battery when the temperature of the solid-state battery acquired by the temperature acquisition section is lower than a predetermined temperature T0.

Charging the solid-state battery having a temperature lower than the predetermined temperature T0 under routine conditions poses a risk of electrocrystallization.

The controller may therefore perform control to heat the solid-state battery using, for example, a heater.

Alternatively, the controller may perform control to increase the temperature of the solid-state battery to a temperature greater than or equal to the predetermined temperature T0 using heat generation of the cell itself during the charging.

Preferably, the charging current $T_1$ during this charging is smaller than during routine charging in order to reduce the risk of electrocrystallization.

The following describes a method by which the controller determines the predetermined temperatures T0 and T2.

The controller plots, in a graph, changes in the temperature of the solid-state battery against the internal resistance of the solid-state battery to determine inflection points.

Specifically, an Arrhenius plot is generated with a Y axis representing an internal resistance-related parameter lnR (R: internal resistance) and an X axis representing a temperature-related parameter 1000/T (T: temperature (K)), and an approximate curve is obtained from the Arrhenius plot.

Next, inflection points on the approximate curve are determined by a second order differential method.

A temperature corresponding to an inflection point on a high-temperature side among the inflection points determined is taken to be the predetermined temperature T2, and a temperature corresponding to an inflection point on a low-temperature side is taken to be the predetermined temperature T0.

The predetermined temperature T2 may be a temperature corresponding to an inflection point at the highest temperature, and the predetermined temperature T0 may be a temperature corresponding to an inflection point at the lowest temperature.

Other than that, for example, the predetermined temperature T2 is preferably 60° C. and may be 80° C.

The solid-state battery exerts excellent charging efficiency at temperatures greater than or equal to 60° C., or at temperatures greater than or equal to 80° C. The above-described configuration therefore provides preferable charging efficiency.

The predetermined temperature T2 may alternatively be set in consideration of the service temperature of components of the solid-state battery.

The following describes details of the control to be performed by the controller with reference to the drawings.

Figure 3:
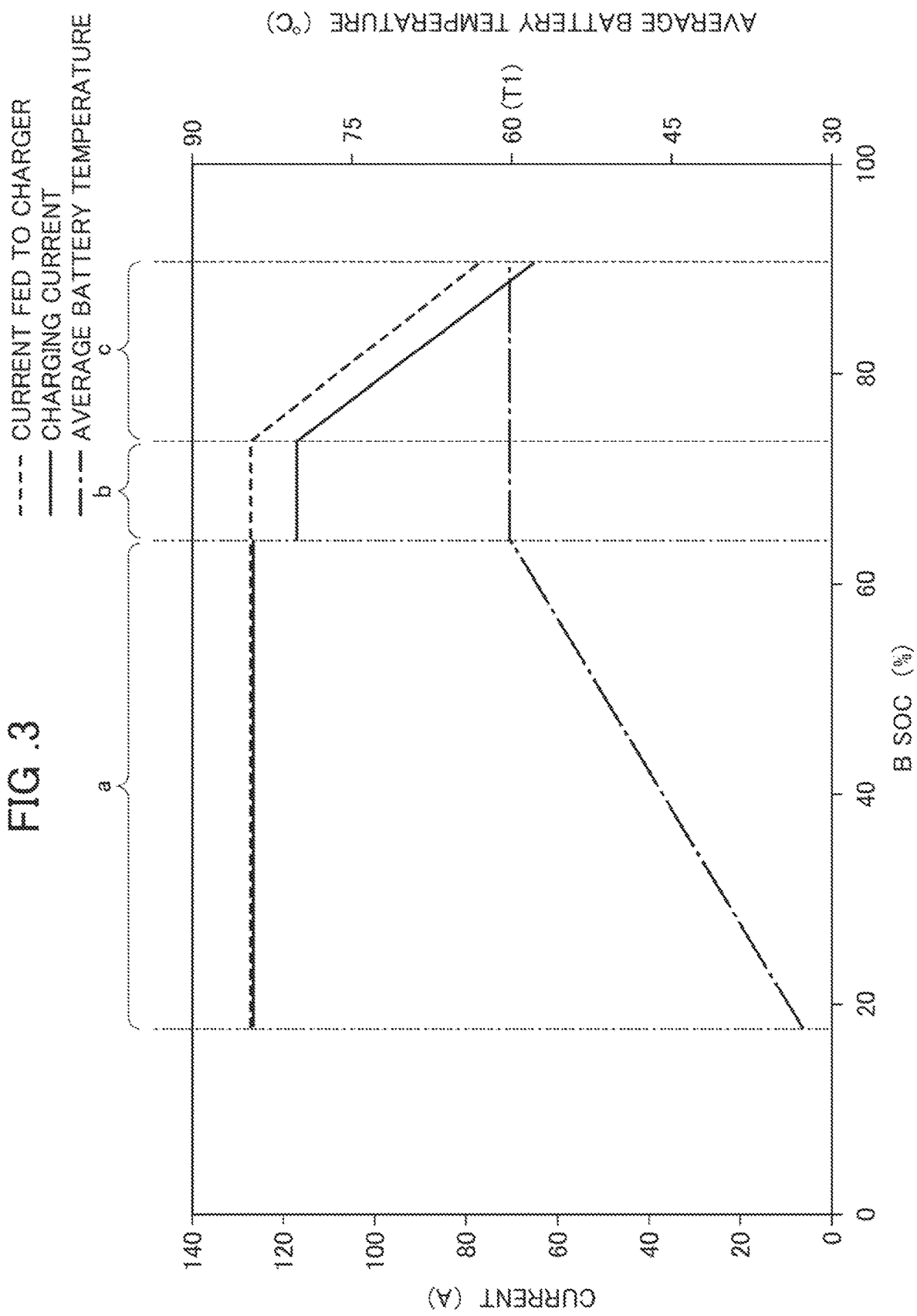
FIG. 3 is a graph schematically showing various parameters of the secondary battery to be charged by the fast charger according to the embodiment.

FIG. 3 is a graph schematically showing changes in charging current being fed to the solid-state battery, current being fed to the charger, and average battery temperature during charge of the solid-state battery.

In FIG. 3, the current being fed to the charger, which is indicated by a dotted line, and the charging current, which is indicated by a solid line, are based on current (A) represented by the Y axis on the left side of FIG. 3.

In FIG. 3, the average battery temperature, which is indicated by a dashed and dotted line, is based on average battery temperature (° C.) represented by the Y axis on the right side of FIG. 3.

State of charge (SOC) (%) represented by the X axis in FIG. 3 indicates the level of charge of the solid-state battery.

The SOC is calculated by dividing the remaining capacity of the solid-state battery by the full discharge capacity of the solid-state battery and multiplying the resulting quotient by 100.

A range a in FIG. 3 is between when the charging of the solid-state battery begins and when the average battery temperature of the solid-state battery reaches a predetermined temperature T1 (60° C. in FIG. 3).

In the range a, control to feed the maximum suppliable current from the charging section to the solid-state battery is performed.

In the range a, a cooler for the solid-state battery such as the cooling system does not operate, and the current being fed to the charger is equal to the charging current.

In the range a, current is fed to the solid-state battery, and the average battery temperature increases as the SOC increases.

This allows the average battery temperature of the solid-state battery to quickly increase into a temperature range where the charging efficiency is high.

A range b in FIG. 3 is between when the average battery temperature of the solid-state battery reaches the predetermined temperature T1 and when the charging current is reduced.

In the range b, control to cause the cooling system for the solid-state battery to operate is performed.

That is, a portion of the current being fed to the charger is consumed by the operation of the cooling system.

The charging current is therefore a value obtained by subtracting the current being consumed by the operation of the cooler such as the cooling system from the current being fed to the charger. That is, there is a difference between the current being fed to the charger and the charging current.

In the range b, the average battery temperature is substantially maintained at the predetermined temperature T1.

A range c in FIG. 3 is between when the reduction of the charging current begins and when the SOC reaches a predetermined level, whereupon the charging is complete.

In the range c, control to reduce the charging current being fed to the solid-state battery is performed.

This control works to reduce the amount of heat to be generated by the solid-state battery.

In the range c, the cooler such as the cooling system continues to operate.

How much to reduce the charging current and when to start reducing the charging current may be determined as appropriate in view of, for example, a reduction in the charging efficiency due to the power for the operation of the cooling system being overly large considering the charging current.

Furthermore, as shown in FIG. 3, it is preferable to perform control to gradually reduce the charging current while continuing the operation of the cooler such as the cooling system.

This allows the average battery temperature to be maintained at the predetermined temperature T1.

<Secondary Battery>

The solid-state battery being a secondary battery, which is charged by the fast charger according to the present embodiment, contains a solid electrolyte.

The solid-state battery is more resistant to heat and chargeable at a higher temperature than other batteries such as lithium-ion batteries containing a liquid electrolyte.

For example, the upper limit of the charging temperature for lithium-ion batteries is approximately 40° C. in view of battery deterioration and safety, whereas solid-state batteries exhibit excellent charging efficiency when the charging temperature is greater than or equal to 60°, or greater than or equal to 80°.

In an on-vehicle application requiring high current and high voltage, for example, the solid-state battery is used in the form of a solid-state battery module, which has a modularized configuration including a plurality of solid-state batteries in combination.

The following describes the configuration of the solid-state battery module, which is charged by the fast charger according to the present embodiment, with reference to the drawings.

(Solid-State Battery)

FIG. 1 is a cross-sectional view illustrating a configuration of the solid-state battery module 100.

The solid-state battery module 100 includes a plurality of solid-state battery cells 101, a module forming member 110, a top cover 113, binding bars 114, a lower plate 115, separators 116, end plates 117, a heat conductor 118, and the cooling water 119.

The solid-state battery cells 101 each include a stack (not shown) of a positive electrode layer, a negative electrode layer, and a solid electrolyte layer disposed between the positive electrode layer and the negative electrode layer.

No particular limitations are placed on the configuration of the solid-state battery cells 101, and a known configuration is adopted. The plurality of solid-state battery cells 101 are arranged substantially parallel to a predetermined direction as illustrated in FIG. 1.

The separators 116 are each disposed between adjacent solid-state battery cells 101.

The separators 116 provide insulation between the adjacent solid-state battery cells 101 and apply uniform pressure thereto.

The end plates 117 and the binding bars 114 are disposed on opposite ends of the plurality of solid-state battery cells 101 and separators 116.

The end plates 117 maintain the alignment of the plurality of solid-state battery cells 101 through application of planar pressure thereto. The binding bars 114 increase cohesion of the plurality of solid-state battery cells 101.

As illustrated in FIG. 1, the top surface of the solid-state battery module 100 is covered by the top cover 113, and thus electrical insulation thereof is maintained.

The plurality of solid-state battery cells 101 are fixed to the lower plate 115 by the binding bars 114, and thus the shape thereof is maintained.

The lower plate 115 is disposed at the bottom of the solid-state battery module 100.

The lower plate 115 is provided with the heat conductor 118 such as a silicone compound and the cooling water 119 for the purpose of cooling the solid-state battery cells 101 through heat conduction from the stack in each solid-state battery cell 101.

The cooling water 119 can be circulated by, for example, a circulator such as a pump in the cooling system so as to be able to exchange heat with the outside.

The module forming member 110 is disposed in an upper portion of the solid-state battery module 100.

Figure 2:
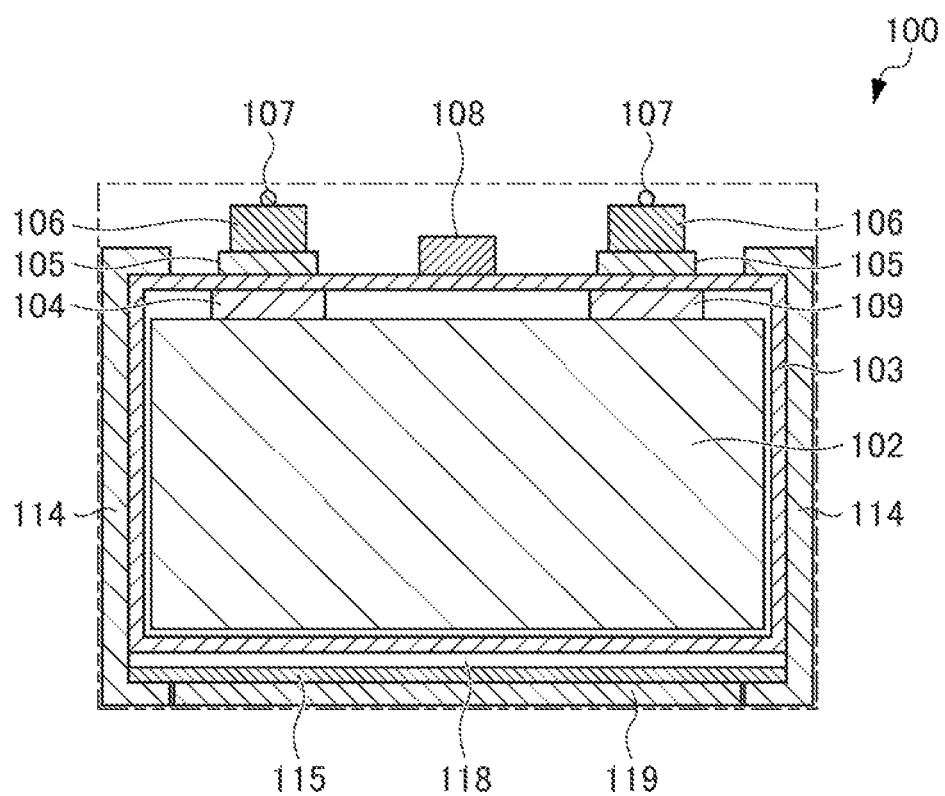
FIG. 2 is a diagram illustrating a secondary battery to be charged by the fast charger according to the embodiment.

FIG. 2 is a cross-sectional view taken along line A-A' in FIG. 1.

As illustrated in FIG. 2, the module forming member 110 includes positive electrode tabs 104, terminals 105, bus bars 106, voltage detection lines 107, a thermistor 108, and negative electrode tabs 109. Each positive electrode tab 104 is electrically connected to the positive electrode layer of the corresponding solid-state battery cell 101. Each negative electrode tab 109 is electrically connected to the negative electrode layer of the corresponding solid-state battery cell 101.

The positive electrode tab 104 and the negative electrode tab 109 are not particularly limited, and may be, for example, accommodated in a battery case 103 containing the stack.

The positive electrode tabs 104 and the negative electrode tabs 109 become hot among others in the solid-state battery module 100.

The solid-state battery module 100 further includes a plurality of sensors (not shown) capable of measuring temperature, voltage, current, and the like of the solid-state battery module 100. Temperatures measurable by the sensors include the temperature of the positive electrode tabs 104 and the negative electrode tabs 109.

The plurality of sensors may be in the form of a sensor unit.

The plurality of sensors are enabled for CAN communication with the temperature acquisition section of the fast charger through a CAN communication line (not shown).

<Fast Charging Method>

Figure 4:
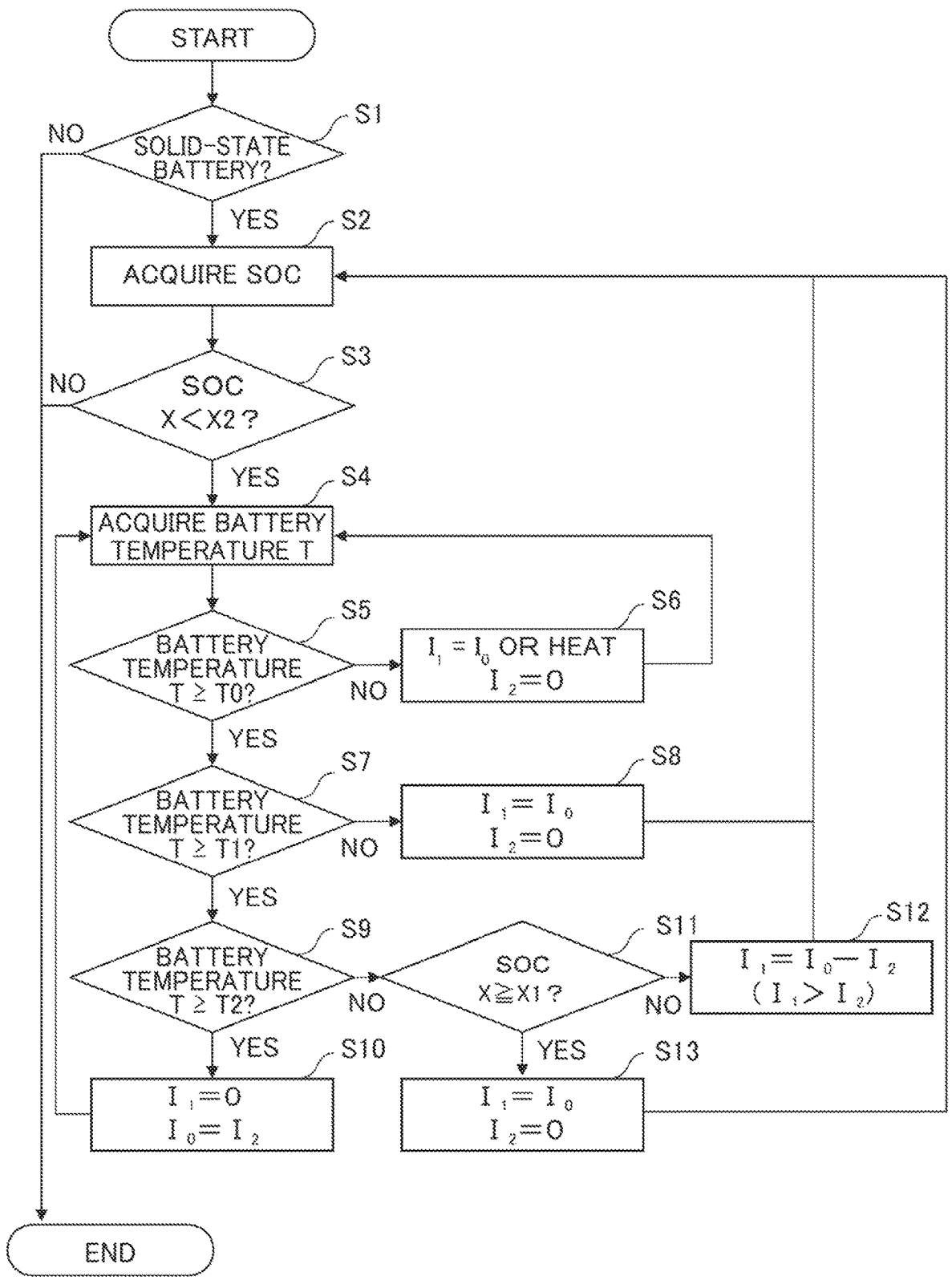
FIG. 4 is a flow chart showing a fast charging method according to the embodiment.

The following describes a fast charging method according to the present embodiment using a flow chart shown in FIG. 4.

As shown in FIG. 4, the fast charging method according to the present embodiment includes an identification step S1, an SOC acquisition step S2, SOC confirmation steps S3 and S11, a battery temperature acquisition step S4, battery temperature confirmation steps S5, S7, and S9, a heating step S6, and current feed steps S8, S10, S12, and 13.

At the identification step S1, the type of the secondary battery to be charged is identified.

The fast charging method according to the present embodiment is to charge a solid-state battery being a secondary battery.

Another type of secondary battery such as a lithium-ion battery may be charged by this fast charging method.

If the secondary battery to be charged is identified as a solid-state battery at the identification step S1, the process advances to the SOC acquisition step S2.

If the secondary battery to be charged is identified as a non-solid-state battery at the identification step S1, the process ends.

Note that after the process ends, a different fast charging method suitable for the secondary battery to be charged may be performed.

At the SOC acquisition step S2, the SOC, which is the level of charge of the solid-state battery, is acquired.

The SOC indicates the level of charge of the solid-state battery and is calculated by dividing the remaining capacity of the solid-state battery by the full discharge capacity of the solid-state battery and multiplying the resulting quotient by 100.

After the SOC acquisition step S2, the process advances to the SOC confirmation step S3.

At the SOC confirmation step S3, it is determined whether or not the SOC (X) of the solid-state battery acquired at S2 is less than a predetermined SOC ($X_2$).

$X_2$ may be set to any numerical value less than or equal to 100.

If the determination result is Yes at the SOC confirmation step S3, that is, if the SOC (X) is determined to be less than $X_2$, the process advances to the battery temperature acquisition step S4.

If the SOC (X) is determined to be greater than or equal to $X_2$, the charge of the solid-state battery is determined to be complete or unnecessary, and the process ends.

At the temperature acquisition step S4, a battery temperature T of the solid-state battery being charged is acquired.

The temperature of the solid-state battery to be acquired at the temperature acquisition step S4 is, for example, at least one of the temperature of the positive electrode tab 104 and the temperature of the negative electrode tab 109, which become hot among others in the solid-state battery.

At the temperature acquisition step S4, temperatures of the positive electrode tabs 104 and the negative electrode tabs 109 of the plurality of solid-state battery cells 101 may be acquired, and an average value thereof may be calculated as the battery temperature T. Alternatively, the battery temperature of the solid-state battery may be estimated from a parameter including at least one of charging current, charging voltage, charging time, ambient temperature, and state of health (SOH) of the solid-state battery.

After the temperature acquisition step S4, the process advances to the battery temperature confirmation step S5.

At the battery temperature confirmation step S5, it is determined whether or not the battery temperature T of the solid-state battery acquired at S4 is greater than or equal to the temperature T0.

If the determination result is No, that is, if the battery temperature T is lower than T0, the process advances to the heating step S6, because routine charging in this case poses the risk of electrocrystallization.

If the determination result is Yes, that is, if the battery temperature T is greater than or equal to T0, the process advances to the battery temperature confirmation step S7.

At the heating step S6, the solid-state battery is heated using, for example, a heater.

Alternatively, the solid-state battery is charged under conditions of charging current $I_1$=fed current $I_0$ and cooling system current $I_2$=0. Through the heating step S6, the battery temperature T of the solid-state battery is quickly increased up to a temperature greater than or equal to the temperature T0, which is a temperature range higher than a temperature range having the risk of electrocrystallization.

In order to prevent electrocrystallization, the charging current $I_1$ being fed during this charging is preferably smaller than the current during routine charging.

After the heating step S6, the process returns to the temperature acquisition step S4, and the heating step S6 is repeated until the battery temperature T is greater than or equal to T0.

At the battery temperature confirmation step S7, it is determined whether or not the battery temperature T of the solid-state battery acquired at S4 is greater than or equal to the temperature T1.

If the determination result is No, that is, if the battery temperature T is greater than or equal to T0 and is lower than T1, the process advances to the current feed step S6.

If the determination result is Yes, the process advances to the battery temperature confirmation step S9.

At the current feed step S8, the solid-state battery is charged under conditions of charging current $I_1$=fed current $I_0$ and cooling system current $I_2$=0.

In this case, the charging current $I_1$ being equal to the fed current $I_0$ allows power P being fed by the fast charger to be a maximum power ($P_{max}$).

The current feed step S8 works to shorten the time required for the battery temperature T of the solid-state battery to reach a temperature greater than or equal to the temperature T1, which is a temperature range where the charging efficiency is high, as well as shortening the charging time.

After the current feed step S8, the process returns to the SOC acquisition step S2 and continues until the charging is complete.

At the battery temperature confirmation step S9, it is determined whether or not the battery temperature T of the solid-state battery acquired at S4 is greater than or equal to the temperature T2.

If the determination result is No, that is, if the battery temperature T is greater than or equal to T1 and is lower than T2, the process advances to the SOC confirmation step S11.

If the determination result is Yes, that is, if the battery temperature T is greater than or equal to T2, the process advances to the current feed step S10.

At the current feed step S10, the solid-state battery is charged under conditions of charging current $I_1$=0 and cooling system current $I_2$=$I_0$.

The current feed step S10 prevents the solid-state battery from being charged if the battery temperature T of the solid-state battery is greater than or equal to the temperature T2, which is a temperature range where the charging is not allowed, and the current is fed only to the cooling system.

Accordingly, the battery temperature T of the solid-state battery quickly decreases into a temperature range lower than the temperature T2.

After the current feed step S10, the process returns to the battery temperature acquisition step S4, and the solid-state battery is cooled until the battery temperature falls below T2.

At the SOC confirmation step S1l, it is determined whether or not the SOC (X) of the solid-state battery acquired at S2 is greater than or equal to a predetermined SOC ($X_1$).

If the determination result is No, the process advances to the current feed step S12.

If the determination result is Yes, the process advances to the current feed step S13.

At the current feed step S12, the solid-state battery is charged under conditions of charging current $I_1$=fed current $I_0$–cooling system current $I_2$.

Note that the charging is performed so as to satisfy the following relationship: charging current $I_1$>cooling system current $I_2$.

The current feed step S12 allows the battery temperature T of the solid-state battery to be maintained at a temperature greater than or equal to T1 and lower than T2, which is a temperature range where the charging efficiency is high.

Since the charging is performed so as to satisfy the relationship: charging current $I_1$>cooling system current $I_2$, charging under inefficient conditions of cooling system current $I_2$>charging current $I_1$ is prevented.

After the current feed step S12, the process returns to the SOC acquisition step S2 and continues until the charging is complete.

At the current feed step S13, the solid-state battery is charged under conditions of charging current $I_1$=fed current $I_0$ and cooling system current $I_2$=0.

The charging efficiency decreases if the charging of the solid-state battery having an SOC (X) of greater than or equal to $X_1$ is continued with the fed power P kept at the maximum power ($P_{max}$).

That is, maintaining the battery temperature T at a temperature lower than T2, which is the upper limit of the charging temperature, results in cooling system current $I_2$>charging current $I_1$.

At the current feed step S13, therefore, the value of charging current $I_1$=fed current $I_0$ is controlled to be smaller than during routine charging so as to prevent the battery temperature T from reaching or exceeding T2.

Furthermore, since the charging is performed under a condition of cooling system current $I_2$=0, charging under inefficient conditions of cooling system current $I_2$>charging current $I_1$ is prevented.

After the current feed step S13, the process returns to the SOC acquisition step S2 and continues until the charging is complete.

If the battery temperature T exceeds the temperature T2 at the current feed step 13, the process returns to the battery temperature confirmation step S9, and then advances to the current feed step S10, so that the battery temperature T is reduced to a temperature lower than T2.

Through the above, a preferred embodiment of the present disclosure has been described.

However, the present disclosure is not limited to the embodiment described above and may be modified as appropriate.

The fast charger according to the present embodiment has been described as a device enabled for fast charging of a solid-state battery being a secondary battery.

However, the fast charger according to the present embodiment is not limited as such.

The fast charger according to the present embodiment may be enabled for fast charging of a secondary battery other than a solid-state battery, such as a lithium-ion battery or a nickel hydride battery, as well as fast charging of a solid-state battery.

The fast charger according to the present embodiment may also be switchable to a charging mode other than fast charging.

For example, the fast charger according to the present embodiment may be switchable to a charging mode that does not require the operation of the cooling system, emphasizing charging cost.

The fast charger according to the present embodiment has been described as a device including the temperature acquisition section and the controller.

However, the fast charger according to the present embodiment is not necessarily limited to including the temperature acquisition section and the controller therein.

For example, the fast charger according to the present embodiment may be used for an on-vehicle solid-state battery being a secondary battery. In this case, the temperature acquisition section and the controller may be provided in the vehicle and enabled for communication with the fast charger.

The solid-state battery module 100, which is charged by the fast charger and the fast charging method according to the present embodiment, has been described using an example in which the solid-state battery module 100 is for use in an on-vehicle application. However, the solid-state battery module 100 is not limited as such. The use application of the solid-state battery module 100 is not particularly limited and may be other than the on-vehicle application. For example, the solid-state battery module 100 may be used in a household power source or an unmanned aircraft such as a drone.

EXPLANATION OF REFERENCE NUMERALS

100: Solid-state battery module (solid-state battery)

What is claimed is:

1. A fast charger comprising:
a charging section configured to feed current to a solid-state battery being a secondary battery;
a temperature acquisition section configured to acquire a temperature of the solid-state battery; and
a controller configured to perform control to cool the solid-state battery if the temperature acquired by the temperature acquisition section is greater than or equal to a predetermined temperature, wherein
the controller determines a plurality of inflection points on a curve representing changes in the temperature of the solid-state battery against internal resistance of the solid-state battery, and
the predetermined temperature corresponds to an inflection point on a high-temperature side among the plurality of inflection points.

2. The fast charger according to claim 1, wherein the temperature of the solid-state battery to be acquired by the temperature acquisition section is a tab temperature.

3. The fast charger according to claim 1, further comprising an identification section configured to identify a type of the secondary battery, wherein
the controller performs the control to cool the solid-state battery if the identification section identifies the secondary battery as a solid-state battery and the temperature acquired by the temperature acquisition section is greater than or equal to the predetermined temperature.

4. A fast charging method comprising:
acquiring a temperature of a solid-state battery being a secondary battery;
determining whether or not the temperature acquired is greater than or equal to a predetermined temperature; and
feeding current to at least one of the solid-state battery and a cooling system, wherein
the temperature of the solid-state battery is maintained at a temperature lower than the predetermined temperature, and
the predetermined temperature corresponds to an inflection point on a high-temperature side among a plurality of inflection points on a curve representing changes in the temperature of the solid-state battery against internal resistance of the solid-state battery.

5. The fast charging method according to claim 4, wherein in the acquiring of a temperature of a solid-state battery, the temperature is a tab temperature.

6. The fast charging method according to claim 4, further comprising identifying a type of the secondary battery.

* * * * *